United States Patent [19]

Comastri

[11] 4,089,668

[45] May 16, 1978

[54] GLASS PLATE BENDING PROCEDURE

[75] Inventor: Mauro Comastri, Monza, Italy

[73] Assignee: Societe Italiana Vetro SIV SpA, San Salvo, Italy

[21] Appl. No.: 789,980

[22] Filed: Apr. 22, 1977

[30] Foreign Application Priority Data

Apr. 22, 1976 Italy .............................. 49126 A/76

[51] Int. Cl.² ............................................. C03B 23/02
[52] U.S. Cl. ....................................... 65/104; 65/106; 65/114; 65/268; 65/273
[58] Field of Search ................ 65/104, 106, 273, 275, 65/114, 268

[56] References Cited

U.S. PATENT DOCUMENTS 2,369,368  2/1945  Paddock et al. .................. 65/273 X Primary Examiner—Arthur D. Kellogg
Attorney, Agent, or Firm—Browdy and Neimark

[57] ABSTRACT

Glass plates are re-shaped and tempered more accurately and with fewer rejects by horizontally passing vertically grasped plates into the heating oven to avoid problems inherent in the prior operation of passing said plates vertically downwardly into the heating oven. The plates are then heated to the softening temperature during horizontal movement through the heating oven and are then passed vertically upwardly to the re-shaping station.

4 Claims, 1 Drawing Figure

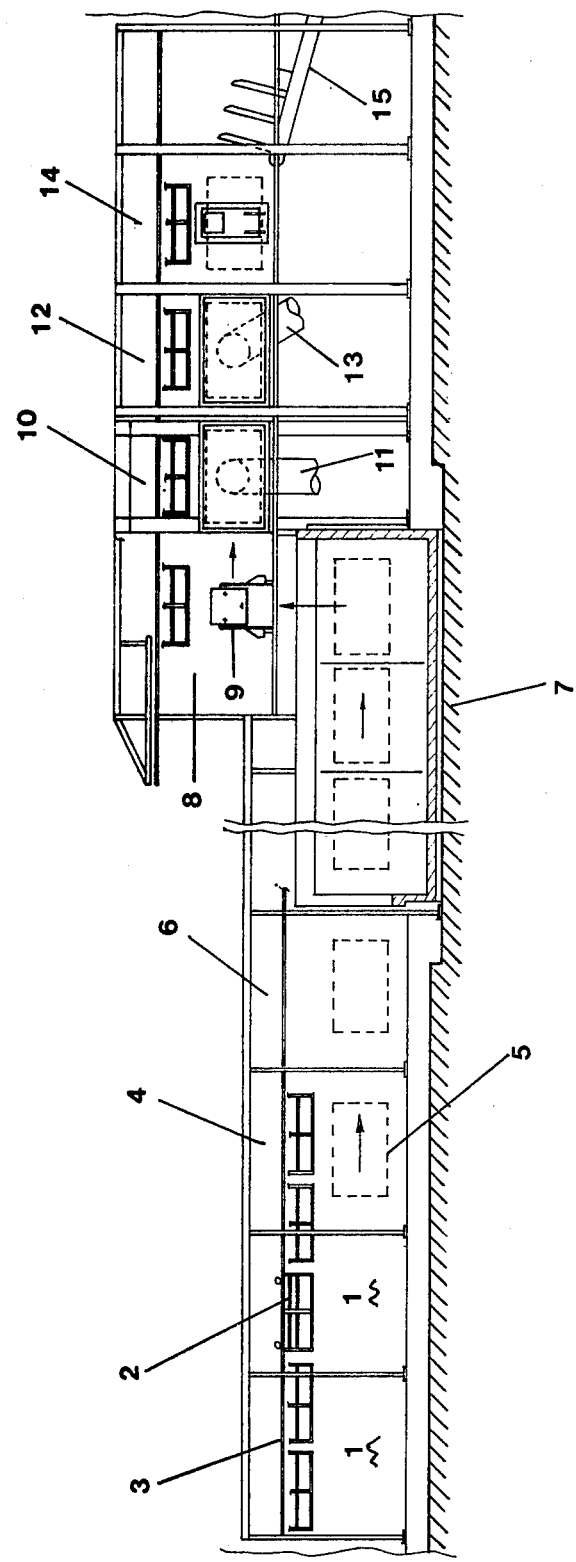

GLASS PLATE BENDING PROCEDURE

The present invention relates to a procedure and a plant for bending and tempering, and also for the selective tempering, of glass plates, particularly thin glass plates.

Curved glass plates are widely used for the windows and wind shields of vehicles, especially of motorcars or the like. When they are used in such applications, the curved glass plates must meet very critical dimensional, mechanical and optical requirements. Therefore the glass plates must be bent according to exactly defined curvatures, depending upon the configuration and the dimensions of the opening within which they must be fitted and also depending upon the model as a whole. It is furthermore necessary that the bent glass plates, used for the glassing of vehicles, be tempered in order to increase their resistance to damage caused by shocks and to modify the shattering characteristics of the glass.

Industrial processes for bending and tempering glass plates are obviously well known and it has become common industrial practice to produce relatively thick tempered glass plates (of a thickness of 5-6 mm), with accurately pre-established curvatures and with acceptable production yields. Recently, however, there has grown a rapidly expanding demand for curved tempered glass which is thin ($\leqq$ 4 mm) for various applications and, while efforts have been and are being made to meet this demand, it is clear that the known and already widely used processes for bending and tempering do not lend themselves for the production of thin glass at acceptable production rates and that therefore the bending and tempering of such thin glass plates raise a new and different series of problems. Presently there are commonly adopted, in the industrial practice, two types of plants for the curving and tempering of glass plates, which present opposite requirements.

In the first type of plant, the various component parts extend on the same axis of a horizontal plane. The still flat glass pane is appended to a trolley by means of clamps, which is today the only clamping system in use. The so positioned glass plate passes, by means of a horizontal displacement of the trolley, through a heating zone, wherein the glass reaches a temperature which is sufficiently high to permit it to be shaped. This temperature, which lies around the so-called softening point, is obtained by any suitable heating system, for instance by gas burners or by electric resistance. Successively, an additional horizontal displacement of this trolley positions the glass into the pressing zone, where it is bent between mold and countermold in a press. An additional horizontal displacement of the trolley positions the already bent plate between two suitably profiled blowers, which are fitted with nozzles. In this zone the glass plate is subjected to blasts of air or of another cooling fluid at speeds which are very high but which vary from nozzle to nozzle, in order to obtain the tempering of the glass, in particular its selective tempering. The same trolley displaces the bent and tempered plate into the zone where it is cooled and discharged.

The processing of the glass plate by such a plant has various drawbacks. In fact, it is extremely important that the glass plate covers the distance between its issue from the heating zone to the blowers within the shortest possible time, in order to minimize heat losses, since the tempering treatment is correlated to the thermal gradient which is brought about in the glass plate before and after its chilling. If the plate is subjected to the air from the blowers when its temperature is already too low, the glass has already had time to change its structure and therefore it is no longer temperable. The minimum time limit for the plate to travel said distance is determined by its length. In fact, for technical reasons, the plate must be hung with its longer side in a horizontal position and therefore, the longer the plate, the longer will be the time required to transfer said plate from the heating chamber to the blowers. Furthermore, it is evident that the thinner the glass plate, the quicker will be its cooling rate and consequently the shorter must be the time for transferring it from the heating to the cooling zone.

A second inconvenience arises from the fact that the plate, during its horizontal displacement from the heating chamber to the press, is subjected to variations of speed, which are justified by the requirement of reducing to a minimum the time of its transfer. Therefore it is unavoidable that, since the clamps do not offer any resistance in a horizontal direction, the glass plate is subjected to oscillations which render difficult its positioning between mold and countermold. The consequence is that often the curvature of the plate is not carried out in a perfect or at least acceptable manner, and this causes a reduction in the production yield.

Attempts have been made to avoid these drawbacks in a second, vertical type plant, whose configuration permits that the critical displacements are performed in a vertical direction.

The flat glass plate is hung, as in the already described plant, to a trolley, which by means of a vertical displacement carries the glass plate into the heating oven located below the loading platform. After having passed in a horizontal direction through the heating zone, the trolley travels vertically upwards and positions the plate into the pressing zone, where it is curved and successively, into the blower zone where it is tempered. Finally, the trolley is displaced in a horizontal direction to carry the finished plate into the chilling and discharging zone.

The vertical configuration of the above described plant eliminates the drawbacks of the horizontal plant, since the displacement of the plate from the heating chamber to the blower zone is performed in the direction of the shorter side of the plate, thereby reducing its transfer time and therefore the possibility that the glass cools excessively prior to being bent and thereafter tempered. Furthermore, since the displacement is performed in an upward direction, the clamps offer a resistance to the vertical oscillations of the plate and thereby facilitate its positioning between mold and countermold.

However, the use of the vertical type plant has a drawback at the point where the plate is introduced into the heating oven. In fact, the vertical downward displacement and the deceleration of the trolley when it is positioned in the heating zone, favors the sliding and, sometimes, the unclamping of the cold glass plate, to which may also contribute the thermal shock to which the glass plate is subjected. So far, neither an auxiliary means has been found which increases in a satisfactory manner the adhesion of the metal clamps upon the glass, nor a different clamping system which permits the pressing of the glass plate. It is evident that the displacement of the plate from its initial and correct position causes its non uniform heating and above all, an inaccurate positioning of the plate between the mold and the countermold during the bending operation. The purpose of the present invention is to provide a bending and tempering procedure and plant for glass plates, particularly for those of reduced thickness, which obviates the drawbacks of today's conventional plants. The procedure and plant according to the present invention are characterized by the fact that the glass plate hung by clamping means in its longitudinal sense to sliding transport means passes in a horizontal direction through the heating oven from which it issues vertically in an upward direction to be positioned between the mold and countermold in the pressing zone where it is bent, and thereafter is displaced in a horizontal or vertical sense towards the blower zone and passes finally into the chilling and discharging zone.

The particular conformation of the plant upstream of the tempering blowers comprises means for the introduction of the plate in a horizontal sense into the heating oven and its successive transfer to the press by an upward movement, thereby reducing to a minimum the duration of this transfer so as to minimize the heat losses of the plate and to ensure its correct tempering, even if the plate is thin. It reduces also the possibility that the plate, owing to its oscillations, is positioned incorrectly between mold and countermold. Furthermore, by excluding the possibility that the plate enters the heating oven in a faulty position, the invention permits a greater regularity and continuity of production with evident increase of the total yield of the plant.

The present invention will be better illustrated in the following by the description of one of its embodiments, made with reference to the sole FIGURE of the attached drawing, representing a schematic longitudinal sectional view of the plant.

With reference to the drawing, there is indicated at 1 the parking station of the means transporting the glass plates, consisting of trolleys 2 capable of sliding in overhead guides 3. In the successive loading station 4 and flat glass plate 5 is hung in a longitudinal sense to a trolley 2 by means of a given number of (not shown) clamps. The trolley 2, with the glass plate 5 clamped to it is shifted to station 6 where it is parked to await its turn to enter the heating oven 7 located on the same horizontal axis of the preceding stations. The oven 7, formed of a certain number of successive heating chambers, is traversed in a horizontal direction by the glass plates 5 attached to their respective trolleys 2. After the heating stage, each glass plate 5 and its relating trolley 2 passes through a (not shown) opening provided in the top of the last heating chamber of oven 7 and is transferred in a vertical direction, by conventional lifting means, to the overlying pressing station 8, where it is positioned between the mold and countermold of a press 9 which confers to the flat glass plate 5 the pre-established curvature. Now the glass plate 5, together with its trolley 2, is shifted to the successive temperating station 10 (in a horizontal direction in the present example), inasmuch as this station is here adjacent to the bending station 9. Alternatively, this transfer may be carried out in a vertical direction, by placing the tempering station 10 above said bending station 9. In the tempering station 10 the bent glass plates 5 are subjected to high velocity blasts of air or of another cooling fluid by blowers 11, which confer to the glass plate the correct temperature. The bent and tempered glass plate 5 is transferred to the cooling station 12 where it is further cooled to room temperature by means of blowers 13. The following station 14 forms the discharge zone, where the finished glass plate 5 is unclamped from the trolley 2 and carried by a conveyor 15 to the store house.

What is claimed is:

1. A procedure for curving and tempering glass plates, particularly glass plates of a thickness of 4 mm and less, which procedure comprises the operations of suspending the glass plate by clamping to be subjected to the curving and tempering treatment with its long side turned in the direction of transport, feeding said glass plate in a horizontal direction to and into a heating oven, carrying said suspended glass plate in said horizontal direction through said heating oven while heating said glass plate to the softening temperature thereof, withdrawing said suspended softened glass plate in a vertical direction upwardly from the heating oven at the end of the heating stage; carrying the suspended glass plate in said vertical direction into a curving press overlaying said oven and positioning it between a mold and countermold in said press in order to confer to it the desired curvature.

2. Apparatus for curving and tempering glass plates, comprising: a heating oven having a horizontally directed entrance opening and a vertically upwardly directed outlet opening; trolley means to suspend by clamping and to carry said glass plates; first guide means for the trolleys carrying said glass plates, said guide means extending horizontally from a trolley parking station through said heating oven; a press station for curving said glass plates and fitted with a mold and countermold positioned over said outlet opening of said heating oven; means to vertically move said glass plates suspended from said trolleys upwardly to said press station; second guide means for said glass plate carrying trolleys extending from the vicinity of said press station at which a blower station is located through a cooling station to a glass plate discharge station and a blower station positioned adjacently to said glass plate bending press.

3. A plant according to claim 2, wherein said blower station for tempering said plates is positioned vertically above said plate curving press, while said cooling and discharge stations are located level with said blower station.

4. A plant according to claim 2, wherein said blower station for tempering said plates is positioned horizontally adjacent said plate curving press, said second guide means for said glass plate carrying trolleys extending from said press through said blower station.

* * * * *